United States Patent
Everhardus et al.

(10) Patent No.: US 7,084,190 B2
(45) Date of Patent: Aug. 1, 2006

(54) MELTABLE INK COMPOSITION

(75) Inventors: Roelof Hendrik Everhardus, Lomm (NL); Erik Kelderman, Utrecht (NL); Marcus Petrus Leonardus Huinck, Herten (NL); Danny Hendrik Maria Hendricks, Sittard (NL); Rudolf Antonius Maria Venderbosch, Duiven (NL); Richard Hendrikus Gerrit Brinkhuis, Zwolle (NL)

(73) Assignee: Oce-Technologies B.V., Ma Venlo (NL)

( * ) Notice: Subject to any disclaimer, the term of this patent is extended or adjusted under 35 U.S.C. 154(b) by 228 days.

(21) Appl. No.: 10/443,880

(22) Filed: May 23, 2003

(65) Prior Publication Data

US 2003/0225187 A1 Dec. 4, 2003

(30) Foreign Application Priority Data

May 27, 2002 (NL) .................................... 1020682

(51) Int. Cl.
*C09D 11/10* (2006.01)
(52) U.S. Cl. .................................................... 523/160
(58) Field of Classification Search ................ 523/160, 523/161; 106/31.29, 31.61, 31.6; 564/153, 564/155, 186, 463; 560/110; 562/400
See application file for complete search history.

(56) References Cited

U.S. PATENT DOCUMENTS

| | | | | |
|---|---|---|---|---|
| 2,173,058 A | * | 9/1939 | Kritchevsky | 554/63 |
| 2,371,737 A | * | 3/1945 | Carson | 524/96 |
| 3,179,627 A | * | 4/1965 | Twitchett | 528/51 |
| 3,575,883 A | * | 4/1971 | Foley | 516/61 |
| 4,066,585 A | | 1/1978 | Schepp et al. | |
| 5,397,388 A | * | 3/1995 | Fujioka | 106/31.29 |
| 5,698,017 A | | 12/1997 | Sacripante et al. | |
| 6,071,986 A | | 6/2000 | Everhardus et al. | |
| 6,110,264 A | * | 8/2000 | Banning et al. | 106/31.29 |
| 6,147,140 A | * | 11/2000 | Jaeger et al. | 523/160 |
| 6,174,361 B1 | * | 1/2001 | Urban et al. | 106/498 |
| 6,235,098 B1 | * | 5/2001 | Maekawa et al. | 106/31.61 |
| 6,471,758 B1 | * | 10/2002 | Kelderman et al. | 106/31.29 |

FOREIGN PATENT DOCUMENTS

| | | |
|---|---|---|
| EP | 0 978 548 A1 | 2/2000 |
| WO | 96/10051 A1 | 4/1996 |
| WO | 98/10172 A2 | 3/1998 |
| WO | WO 02/48459 A2 * | 6/2002 |

OTHER PUBLICATIONS

Benthem, Rolf A.T.M., Progress in Organic Coatings, vol. 40, pp. 203-214, 2000.

* cited by examiner

*Primary Examiner*—Callie Shosho
(74) *Attorney, Agent, or Firm*—Birch, Stewart, Kolasch & Birch, LLP

(57) ABSTRACT

A meltable ink composition, which is solid at room temperature and liquid at elevated temperature, which ink composition is suitable for use in an inkjet printer, the ink composition being provided with a resin which contains a compound which is the reaction product of a di-alkanolamine and a monofunctional aromatic acid and optionally a difunctional acid.

6 Claims, No Drawings

MELTABLE INK COMPOSITION

BACKGROUND OF THE INVENTION

This non-provisional application claims priority under 35 U.S.C. §119(a) on patent application Ser. No. 1,020,682 filed in The Netherlands on May 27, 2002, which is herein incorporated by reference.

1. Field of the Invention

The present invention relates to an ink composition which is solid at room temperature and liquid at elevated temperature, said ink composition containing a resin and being suitable for use in an inkjet printer.

2. Related Art

It is known to use resins in relatively large quantities in meltable ink compositions (hot melt inks) for inkjet printers. Inks of this kind are solid at room temperature and melt at elevated temperature. Typical melting points are in the range of 60 to 120° C. The melted inks are jetted at a temperature at which they are thinly viscous, typically 100 to 160° C., by means of an inkjet printer as adequately known from the prior art. Resins enable the ink to be sufficiently tough after cooling so that the ink is more resistant to mechanical loads on the printed receiving material, such as gumming, scratching and folding. Although crystalline materials are generally harder, they are also much more brittle, so that printed matter made using a mainly crystalline ink composition is fairly sensitive to damage. The use of resins in ink compositions also has the advantage that dyes can be dissolved relatively well therein and pigments can be dispersed relatively easily therein. In addition, resins have the advantage that after solidification they are often transparent so that it is possible to make color prints using subtractive color mixing. The disadvantage of resins is that generally they are relatively viscous, even after they have been softened at high temperature, and cannot therefore be used in large quantities in hot melt inks.

Amorphously solidifying monomeric resins are known from U.S. Pat. No. 6,071,986. Resins of this kind, which solidify completely amorphously, have the advantage that they are not very viscous, because of their relatively low molecular weight. The disadvantage of these resins, however, is that their amorphous state is not sufficiently stable. As a result, these resins will also crystallise after a shorter or longer period. Even if these known resins are used in an ink composition, there will be some post-crystallization of the resins. This in turn has the result that the quality of a printed image, i.e. after the corresponding ink has solidified on the receiving material, will deteriorate in the course of time.

Esters of 2,2'-biphenol and aromatic acids are known from EP 0 978 548. These are also examples of monomeric amorphously solidifying resins. However, these resins still appear to have some tendency to post-crystallization so that the properties of the solidified ink change in the course of time, particularly when printed receiving materials are stored under extreme conditions, for example at relatively high temperatures.

SUMMARY OF THE INVENTION

The object of the present invention is to provide an ink composition suitable for use in an inkjet printer, which ink composition contains a resin having a low viscosity at the inkjet printer operating temperature, which resin solidifies amorphously and exhibits little post-crystallization if any. To this end, in a first embodiment of the ink composition according to the present invention the resins present therein contain a compound which is the reaction product of a di-alkanolamine and a monofunctional aromatic acid. It has surprisingly been found that a resin of this kind which has a low melt viscosity (technically it is more correct to refer to "softening viscosity" but this is unusual in the technical area concerned) solidifies amorphously despite its low molecular weight and exhibits practically no tendency to post-crystallization.

According to a second embodiment of the present invention, the ink composition contains resins which contain a compound which is the reaction product of a di-alkanolamine and a monofunctional aromatic acid and a difunctional acid. These resins also have a very low melt viscosity and yet it solidifies amorphously and has practically no tendency to post-crystallization. The resin according to this second embodiment of the present invention often contains a mixture of monomeric and oligomeric reaction products, the precise composition of which depends, inter alia, on the ratio of the reactants and the reaction conditions. Despite the fact that the average molecular weight of this resin is higher than that of the pure monomeric product according to the first embodiment of the invention, it has been found that the melt viscosity is scarcely higher, if at all. The amorphous state of this resin has been found to be more stable than that of the first embodiment of the present invention. This is probably a result of the fact that this resin is often a mixture of related compounds.

From WO 96/10051 a polyamide resin is known which is suitable for use in hot melt inks, said resin being the product of the reaction between an amino alcohol, a monofunctional acid and a di-acid. These resins have the disadvantage that they are waxy and often not sufficiently transparent in the solidified state because they are partially crystalline.

From U.S. Pat. No. 4,066,585 a synthetic polyamide resin is known for intaglio and flexographic printing, which resin is the condensation product of (1) an acid component comprising a dimerised fatty acid and a monofunctional carboxylic acid and (2) an amine component comprising a diamine and a diol and/or an alkanol amine. These resins are also fairly waxy and often not sufficiently transparent in the solidified state. These resins therefore are hardly suitable for use in inkjet printers subject to high requirements such as, for example, quality, speed, reliability, variety of media for printing, and so on ("high demand" printers).

U.S. Pat. No. 5,698,017 describes resins as a vehicle material for an ink composition. These resins, e.g., oxazolines, are the reaction product of an organic acid and an amino alcohol. Resins of this kind have the disadvantage that they solidify in crystalline form and therefore result in brittle ink layers on media. Such layers have poor resistance to mechanical impacts such as gumming, scratching and folding.

*Progress in Organic Coatings*, Volume 40 (2000), pages 203–214, describe hyperbranched polyester amides derived from cyclic anhydrides and di-alkanolamines. These resins are described as a constituent in liquid film-forming compositions for coating applications. The use in solid meltable compositions which do not form films is not described. Also, use in hot melt ink compositions is not possible because the resins described are much too viscous to be considered for such an application.

In another embodiment of the first-mentioned embodiment of the present invention, the compound is the reaction product of di-isopropanolamine and benzoic acid, the latter being optionally substituted by an alkyl and/or alkoxy group. It has been found that the compound of this ink composition is thermally very stable in respect of viscoelastic properties. This is an advantage in the printing of hot melt ink because the ink in the actual print head generally has to experience a number of heating-up/cooling cycles (printer on/off) before the ink is actually jetted. Also, this compound has the advantage that it can be made without the addition of a catalyst. This is also an advantage in use in a hot melt ink since any contamination in the ink, no matter how small, may have a negative influence on the functioning of the inkjet printer (unstable jet behavior, nozzle clogging, wetting problems, and so on).

In a further embodiment, the benzoic acid is substituted by a C1–C4 alkyl and/or a C1–C4 alkoxy group. The physical properties of the compound and hence of the resin can be adjusted more accurately by the use of a substituted benzoic acid.

In a further embodiment of the present invention in which the compound, for the same reasons as indicated hereinbefore, is the reaction product of di-isopropanolamine and benzoic acid optionally substituted by an alkyl and/or alkoxy group, the difunctional acid is restricted to an organic acid containing an aliphatic, aromatic or alicyclic main group (i.e. the longest non-functional chain in the acid) with 12 carbon atoms at maximum. It has been found that this leads to very stable compounds. In a further embodiment, the difunctional acid contains an aliphatic or alicyclic main group. It has been found that the compound has a relatively low glass transition temperature (Tg) and a low melt viscosity. In yet another embodiment, the difunctional acid is selected from the group consisting of succinic acid, adipic acid and cyclohexane dicarboxylic acid (cis and/or trans form). The use of such acids results in ink compositions which are relatively tough after cooling and thus very resistant to mechanical loads on the image printed therewith.

Preferably, the ink compositions according to the present invention contain a meltable crystalline material and optionally an amorphously solidifying monomer as known from U.S. Pat. No. 6,071,986. In this way the properties of the ink composition can be accurately adjusted and adapted, for example to the typical properties of the printer, the selected receiving material, the type of image, and so on.

Preferably, the ink composition contains a viscosity control agent, for example a gelling agent as known from EP 1,067,175. In this way, for example, the solidification behavior of the ink composition can be accurately adjusted. In addition to such viscosity control agents, the ink may contain additives such as UV protectors, anti-oxidants and other preservative substances, surfactants, and other additives as known from the prior art. As is known for hot melt inks generally, inks of this kind can be used in different types of inkjet printers and in combination with different receiving materials. The receiving material used may, for example, be a cheap plain paper because hot melt inks are generally relatively insensitive to feathering. Alternatively, hot melt inks can be transferred to receiving materials particularly suited for inkjet uses, such as Bond paper, Laminate bond paper, EconoBond, DuraBanner, Removable Tyvek, EconoVinyl and WaterFast Removable Vinyl made by Colorspan; 600 016-1474-00 Smooth white bond, 016-1476-00 Photograde paper, 016-1478-00 Premium tracing/Backlit paper, 016-1479-00 Backlit display film and 016-1496-00 Transparency film made by Tektronix; NC Photodry made by Zanders; Photoglossy paper GP201 and High gloss photofilm made by Canon; Photo quality glossy film SO41073 and SO 41071 made by Epson; Premium water resistant H75000 and H75007 made by Felix Schoeller, Ilfojet dry satin made by Ilford; 3290 IJP200 made by Sihl; backlit IJM562 made by Oce. If required, the printing of hot melt ink on such receiving materials may be combined with heating the receiving material, particularly just before or after printing. In this way it is often possible to obtain a specific degree of gloss, for example matt, silk gloss or high gloss.

The invention will now be explained further by reference to the following examples. Where these examples refer to a "part" of a specific reactant, then unless otherwise indicated this means a "molar part".

DETAILED DESCRIPTION OF THE INVENTION

Table 1 shows the reaction products of di-isopropanolamine and aromatic acids;

Table 2 shows the reaction product of di-isopropanolamine, an aromatic acid and a difunctional aliphatic acid, before and after thermal loading; and Table 3 shows ink compositions comprising the reaction products of Tables 1 and 2.

Example 1 shows a process for making reaction products as indicated in Table 1.

Example 2 shows a process for making reaction products as indicated in Table 2.

Table 1

Table 1 shows a number of reaction products of di-isopropanolamine and various aromatic acids. The first product is formed by the reaction of one part of di-isopropanolamine and three parts of benzoic acid. The second product is formed by the reaction of one part of di-isopropanolamine and three parts of 2-methylbenzoic acid. The third product is formed by the reaction of two parts of di-isopropanolamine, three parts of 2-methylbenzoic acid and three parts 4-t-butylbenzoic acid. The fourth product is formed by the reaction of one part of di-isopropanolamine and three parts 4-methoxybenzoic acid. The fifth and last product in this Table is formed by the reaction of one part of di-isopropanolamine and three parts 4-methylbenzoic acid.

The second column of Table 1 shows the glass transition temperatures of the respective compounds. These are measured using a Differential Scanning Calorimeter (DSC), namely the DSC-7 made by Perkin Elmer, Norwalk, Conn. The glass transition temperature of a resin in this test is equated with the onset of the bending point of the enthalpy increase corresponding to the glass transition as measured in the heating of a resin at 20° C./min. To know the thermal history of a resin, each resin is heated once, prior to measurement, to above its glass transition temperature (20° C./min) and then rapidly cooled to room temperature ("quenching").

Finally, Table 1 gives, for each of the compounds, the viscosity at three measurement temperatures. This viscosity is measured using a steady shear viscosimeter, namely the DSR-200 made by Rheometric Scientific, Piscataway, N.Y., using the known plate-cone geometry. The viscosity follows from the ratio between the stress required to shear the resin and the shearing speed in equilibrium.

The reaction product given in this Table are monomeric distinct compounds. They can be used as resins in a hot melt ink, alone or in mixture with one or more other rasins. These amorphous compounds have a relatedly low viscosity at typical jet temperatures of 130–160° C. and are thermally stable. Both properties are favorable for use in a high-demand ink jet printer. The compounds solidify amorphously and their amorphous state is very stable. Even after a long time and under extreme conditions (for example storage above the glass transition temperature) there practically is no perceptible post-crystallization. As a result, images printed with an ink coposition in which these amorphous compounds have been used as resin retain their initial quality for a long period of time.

TABLE 1

Reaction products of di-isopropanolamine and aromatic acids.

| No | Reaction product of: | Tg [° C.] | Viscosity [mPa · s] (measuring temperature in ° C.) | | |
|----|----------------------|-----------|------|------|------|
| 1 | di-isopropanolamine (1 part) and benzoic acid (3 parts) | 7 | 37 (110) | 16 (130) | 8 (150) |
| 2 | di-isopropanolamine (1 part) and 2-methylbenzoic acid (3 parts) | 3 | 37 (110) | 16 (130) | 9 (150) |
| 3 | di-isopropanolamine (2 parts) and 2-methylbenzoic acid (3 parts) 4-t-butylbenzoic acid (3 parts) | 14 | 127 (110) | 39 (130) | 17 (150) |
| 4 | di-isopropanolamine (1 part) and 4-methoxybenzoic acid (3 parts) | 23 | 91 (120) | 34 (140) | 16 (160) |
| 5 | di-isopropanolamine (1 part) and 4-methylbenzoic acid (3 parts) | 19 | 40 (120) | 17 (140) | 9 (160) |

Table 2

Table 2 is an example of a compound according to the second embodiment of the present invention. It relates to the reaction product as indicated under Example 2. This product is not a distinct compound but a mixture of monomeric and oligomeric compounds in accordance with formula 1 (n=0, n=1, n=2, and so on), this being the notation for the most probable molecule structure of the resulting compounds. Despite its fairly high molecular weight, this mixture nevertheless has a relatively low viscosity at the typical jet temperatures.

The second row of Table 2 gives the same reaction product, but in this case the product was thermally loaded for two weeks at 130° C. in an oven. In the practice of inkjet printing, such a loading would be expected only under extreme conditions (printer continuously on but with hardly any printing if at all). It has been found that the physical properties of the reaction product after this heavy loading have scarcely altered. The viscosity has dropped slightly and there is minimal brown coloration. Changes could scarcely be perceived with NMR after loading. There was found to be a small increase in the free benzoic acid (and this may possibly explain the fall-off in viscosity).

TABLE 2

Reaction product of di-isopropanolamine, an aromatic acid and difunctional aliphatic acid, before and after thermal loading.

| No | Product | Tg [° C.] | Viscosity [mPa · s] (measuring temperature) | | | |
|----|---------|-----------|------|------|------|------|
| 6 | Resin in accordance with Example 2 | 17 | 80 (120) | 30 (140) | 15 (160) | |
| 6' | Resin in accordance with Example 2, two weeks thermal loading at 130° C. | 15 | 70 (120) | 26 (140) | 14 (160) | |

Table 3

Table 3 gives a number of ink compositions according to the present invention. A hot melt ink can be made up, for example, by combining one or more resins, for example as shown in Tables 1 and 2 of U.S. Pat. No. 6,071,986, Table 3a and 3b of EP 1 067 157 and Table 1 of EP 0 978 548, with one or more crystalline materials, for example as shown in Table 3 of U.S. Pat. No. 6,071,986, Table 2 of EP 1 067 157 and Table 3 of the Netherlands Patent Application 1017049, which is not a prior publication, and providing the same with additives as dyes and/or pigments, anti-oxidants, wetting agents, viscosity control agents (for example a gelling agent as known from Table 1 of EP 1 067 157), UV-protectors, and so on.

Table 3 gives the basic composition or the vehicle composition of three inks according to the present invention. Each of the inks has a basic composition made up of 70% by weight of a crystalline component and 30% of a resin according to the invention. In each case in this example, the crystalline component is a bis-ester of a low alkane diol (respectively 1,3-propanediol, 1,4-butanediol and 1,6-hexanediol) and an aromatic acid (respectively 4-methoxybenzoic acid, 4-methylbenzoic acid and 4-methoxybenzoic acid). The resins are selected from the products given in Tables 1 and 2. Each of these inks is provided with viscosity control agents (not shown in the Table) namely 1% (one part by weight per 100 parts by weight of ink), pentaerythritol tetrabehenate and 1% bis-ester amide of 1,10-dodecanediacid and 3-methoxypropylamine. In addition, each of these inks contains a dye, in this case 1.5% Waxoline Blue AP made by ICI. As further additives the inks contain 0.1% Byk 309 (surfactant) and 0.5% Vanox 1005 (antioxidant).

TABLE 3

Basic composition of inks according to the invention

| Ink | Crystalline component (70% by weight) | Resin (30% by weight) |
|-----|---------------------------------------|------------------------|
| a) | Bis-ester of propanediol and 4-methoxybenzoic acid | product no 6 (table 2) |
| b) | Bis-ester of butanediol and 4-methylbenzoic acid | product no 4 (table 1) |
| c) | Bis-ester of hexanediol and 4-methoxybenzoic acid | product no 1 (table 1) |

EXAMPLE 1

This Example describes a process for making product No. 1 from Table 1, the process also being suitable for making comparable reaction products, particularly products 2 to 5 as shown in Table 1.

Synthesis of product 1 was carried out as follows. A 250 ml 3-neck round-bottom flask was provided with a mechanical agitator, a thermometer and a DeanStark arrangement. 64.97 g (0.488 mol) of di-isopropanolamine (Aldrich) and 178.70 g (1.463 mol) benzoic acid (Aldrich) were placed in the flask. A small quantity of o-xylene was also added, about 20 ml, as entraining agent to remove the liberated water. The reaction mixture was heated to 180° C. and kept under a nitrogen atmosphere. After half an hour, the temperature was again raised to 190° C. After three hours, the flask was evacuated to remove the o-xylene. When the o-xylene had been removed, after about three-quarters of an hour, the reaction mixture was drawn off. This mixture contained mainly product 1 (Table 1), this product being identical to the formula 1 compound with n=0.

EXAMPLE 2

This Example describes a process used for making reaction product 6 as indicated in Table 2, namely a reaction product of di-isopropanolamine, benzoic acid and succinic acid anhydride. A 1 liter reaction flask was provided with a mechanical agitator, a thermometer and a DeanStark arrangement. 261.06 g (1.960 mol) of di-isopropanolamine (type S, BASF) 540.88 g (4.429 mol) benzoic acid (Aldrich) and 69.69 g (0.696 mol) of succinic acid anhydride (Aldrich) were placed in the flask. A small quantity of o-xylene, about 60 ml, was added as entraining agent to remove the liberated water. The reaction mixture was kept under a nitrogen atmosphere and heated for 1 hour at 165° C., whereafter the reaction temperature was raised to 180° C. After 6 hours the temperature was reduced to 160° C. and the flask was evacuated to remove the o-xylene. It was possible to draw off the reaction mixture after about 1 hour. Analysis showed that the number-averaged molecular weight ($M_n$) was 583 and the weight-averaged molecular weight ($M_w$) was 733. The ratio between $M_w$ and $M_n$ (1.26) showed that there was a mixture of compounds formed. The diagram below (formula 1) indicates what compounds may form during the reaction between di-isopropanolamine, benzoic acid and succinic acid (it should be noted that formula 1 is the most probable structure of the resulting compounds). The reaction shows the formation of a mono-disperse compound. The ratio in respect of reactants as indicated in the formula belongs to a chosen value for n. This ratio need not necessarily be identical to the ratio for the overall reaction, where in fact a mixture of compounds with different values for n is formed. In the reaction according to this example, a ratio has been chosen which is equal to 2.82:6.36:1 (di-isopropanolamine:benzoic acid:succinic acid anhydride). This means that there are 3×2.82=8.46 mol equivalents of reactive NH/OH groups in the amine, as against 6.36+2×1.00=8.36 mol equivalents of acid groups in the benzoic acid and anhydride. There is therefore only a very small excess (about 1%) of di-isopropanolamine.

A GPC analysis showed that the mixture contained approximately 45% by weight of the compound with n=0, about 40% by weight of the compound with n=1 and about 15% by weight of compounds with n=2 or higher. This is approximately equivalent to 60 mol. % of the compound with n=0; 30 mol. % of compound with n=1 and 10 mol. % of compound with n=2 or higher.

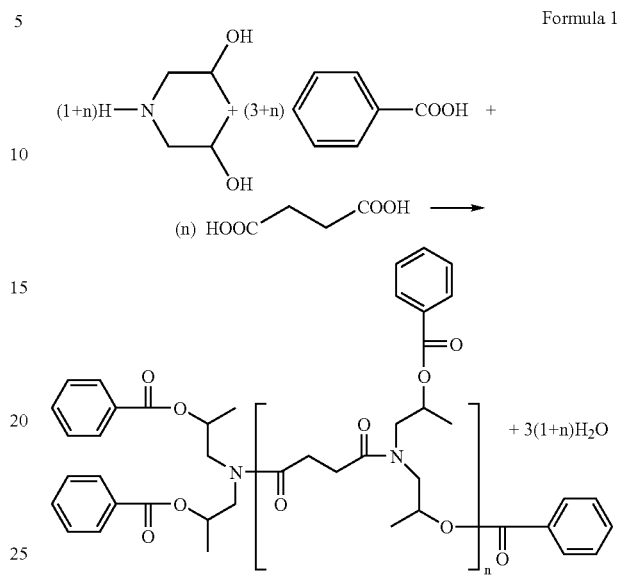

Formula 1

Other compound for ink compositions according to the invention can be made in a similar manner to that given in Examples 1 and 2. Changes in the ratio of the reactants or the type of reactants (for example an anhydride instead of the acid and/or vice-versa) may influence the synthesis. In this way, the skilled man can obtain an ink composition tailored to his purpose.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ink composition which is solid at room temperature and liquid at elevated temperature, said ink composition being suitable for use in an inkjet printer and is provided with a resin, wherein the resin contains a compound which is the reaction product of a di-alkanolamine, a mono-functional aromatic acid and a difunctional acid.

2. The ink composition according to claim 1, wherein the compound is the reaction product of di-isopropanolamine, benzoic acid optionally substituted by an alkyl and/or alkoxy group, and a di-functional organic acid containing an aliphatic, aromatic or alicyclic main group having no more than 12 carbon atoms.

3. The ink composition according to claim 2, wherein the benzoic acid is substituted with a C1–C4 alkyl and/or a C1–C4 alkoxy group.

4. The ink composition according to claim 2, wherein the di-functional acid contains an aliphatic or alicyclic main group.

5. The ink composition according to claim 4, wherein the di-functional acid is selected from the group consisting of succinic acid, and cyclohexane dicarboxylic acid.

6. The ink composition according to claim 5, wherein the compound is the reaction product of di-isopropanolamine, benzoic acid and succinic acid.

* * * * *